Patented June 2, 1925.

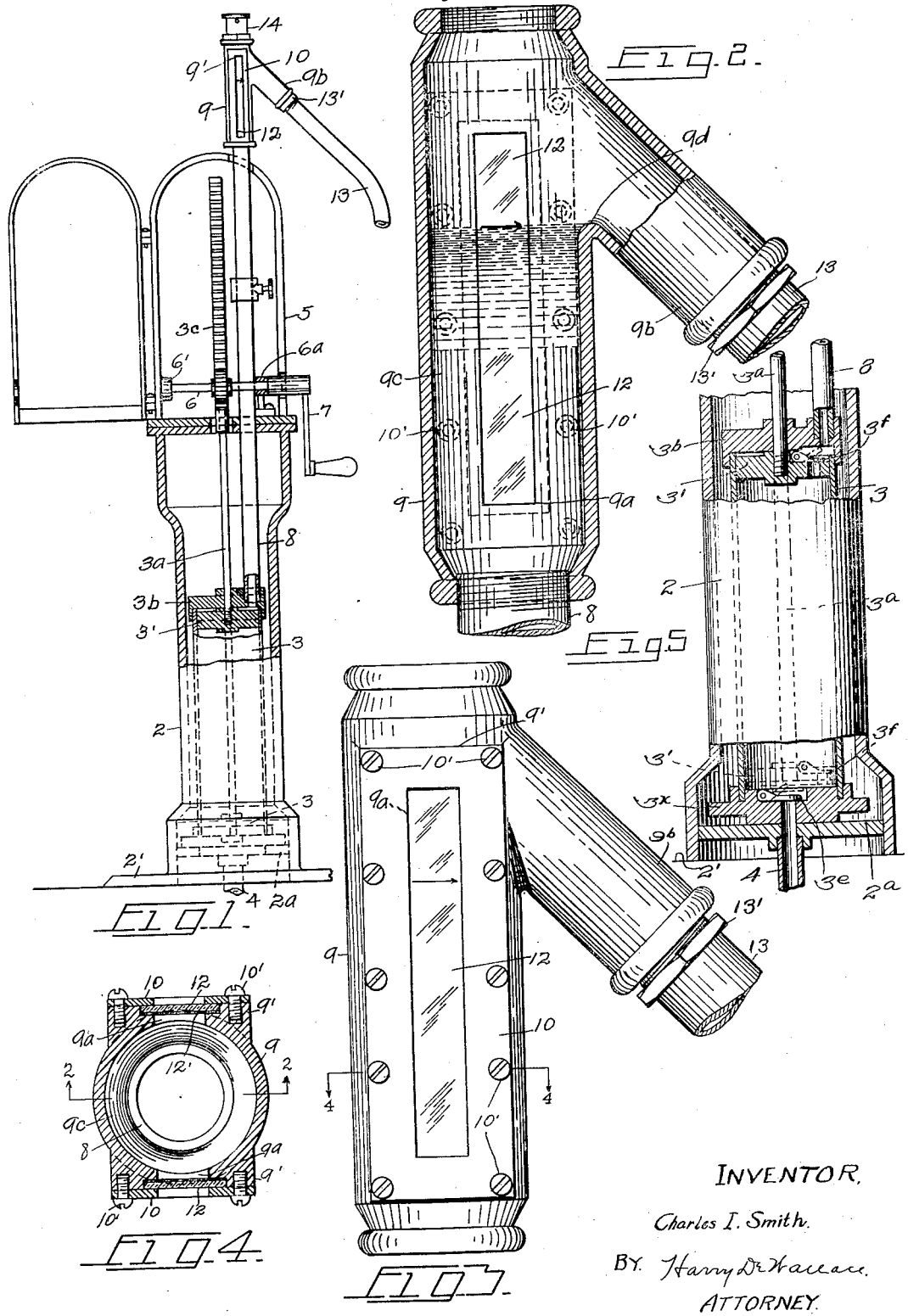

1,539,917

UNITED STATES PATENT OFFICE.

CHARLES I. SMITH, OF THERESA, NEW YORK.

LIQUID-LEVEL INDICATOR.

Application filed September 5, 1924. Serial No. 736,125.

*To all whom it may concern:*

Be it known that I, CHARLES I. SMITH, a citizen of the United States, residing at Theresa, in the county of Jefferson and State of New York, have invented certain new and useful Improvements in Liquid-Level Indicators, of which the following is a specification.

This invention relates to improvements in liquid level indicators, designed particularly for use in connection with the well-known gasolene vending machines, and has for its object to provide novel and simple means for indicating the level of the gasolene above the automatic measuring pumps, at the start of the vending operations.

In many of the self-measuring gasolene pumps in common use at public filling stations, the gasolene is drawn from large storage reservoirs into the measuring cylinders, preparatory to the delivery of the oil to the tanks of automobiles, by the downward movement of the pump pistons. This operation is designed, when all of the parts are in perfect order, to lift a predetermined number of gallons of the fluid to a certain level above the pumps, from whence the fluid starts to gravitate through the hose towards the tanks of the automobiles, at the first turn of the crank by the vendor.

Ordinarily there is nothing about these pumping mechanisms to indicate whether or not the exact amount of gasolene purchased is being delivered through the hose, or whether the pump is conditioned to lift the full amount of the fluid at each reversal of the piston. If there is a leak, however small, in the pipe line leading from the main reservoir to the pump, in the foot-valve, or in the pump itself due to faulty packing, there will be a corresponding shortage of the predetermined amount of gasolene displaced by the piston when the latter is moved upwardly by the operation of the usual vending crank.

The primary object of the present invention is to provide means for indicating in advance of the vending operations, whether the pump and related parts are in a perfect or leaky condition. To this end my indicating device comprises an elongated hollow body, which may be screwed onto the top end of the usual overhead delivery pipe, the said body being formed with oppositely disposed longitudinal openings, over which are imposed strips of transparent glass, through which the level of the gasolene in said body may be clearly observed, the said transparent coverings being marked to indicate the proper level of the liquid at the start of each vending operation, when the pump, the supply line, and the valves are all in perfect condition; the said transparent openings also enabling the purchaser, as well as the vendor, to instantly detect any discrepancy or shortage of the predetermined measure of the gasolene, by indicating sub-normal levels of the liquid in the body of the device, due to leakage or other defects. The said body is also formed with a downward angular discharge branch, to which the usual flexible dispensing hose may be directly connected.

I attain these objects by the means set forth in the detailed description which follows, and as illustrated by the accompanying drawing, in which—

Figure 1 is an elevational view of a gasolene vending machine of a certain type, to which my improvement is applied. Fig. 2 is an enlarged central vertical section, taken on line 2—2 of Fig. 4. Fig. 3 is an enlarged front elevation of the indicator, and Fig. 4 is a horizontal section, taken on line 4—4 of Fig. 3. Fig. 5 is an enlarged broken elevation of the oil pump, showing check-valves respectively in the piston and in the bottom of the pump cylinder.

Ordinarily the main storage tank of a filling station is buried in the earth, and connects with the measuring pump by means of a line of piping, which is equipped with suitable valves for controlling the flow of the gasolene towards said pump. All of these parts being well understood, they are not shown or described in detaiil.

In the drawing, Fig. 1 illustrates conventionally a gasolene pumping mechanism, which comprises a hollow pedestal-like body 2, which rises from an enlarged base 2'. Within the body 2 is disposed the gasolene measuring cylinder 3, which may be supported in any suitable manner, as by a flange 2ª. The bottom end of the cylinder 3 is tapped by a feed pipe 4, which conducts the gasolene from the storage reservoir (not shown) to the pump. The cylinder 3 is usually equipped with a piston 3', which is reciprocable vertically by means of a rod 3ª, the latter extending upwardly through the cylinder-head $3^b$, above which said rod is rigidly connected to an alining rack $3^c$, which is disposed in a chambered casing 5. Within the chamber 5 is mounted a shaft 6, which is supported horizontally by bearings $6'$—$6^a$, and intermediate said bearings said shaft is fitted with a pinion $3^d$, which meshes with and operates the rack $3^c$, when said shaft is rotated by means of a crank 7. The full lines in Fig. 1 show the piston $3'$, the rod $3^a$ and the rack $3^c$ in their uppermost positions, which marks the end of a vending operation. The subsequent lowering of the piston $3'$, to the dotted position shown in Fig. 1, by the reverse turning of the crank 7, effects the filling of the said cylinder with a predetermined amount of fresh gasolene, ready to be delivered to the next customer, when the piston $3'$ is raised by the turning of shaft 6.

The head $3^b$ of the cylinder is shown tapped by an upright pipe 8, whose top threaded end screws into the lower end of an elongated hollow fitting 9, which comprises the body of my liquid level indicator. The front and rear sides of the body 9 are formed with similar longitudinal bosses $9'$, which extend substantially the length of the body and are correspondingly slotted, as at $9^a$ (see Fig. 4) and both bosses are fitted with similar slotted plates 10, which are secured in place by screws $10'$. Between the plates 10 and the bosses are disposed similar windows, comprising strips of transparent glass 12, which are preferably disposed in shallow recesses which surround the slots of the bosses, and rest upon packing $12'$, for sealing the joints, as best seen in Fig. 4. The windows 12 are disposed opposite each other and afford a clear view of the interior $9^c$ of the body, when the fitting is viewed from either the front or rear sides. The transparent members 12 are preferably narrower than the plates 10 and are disposed entirely between the rows of screws $10'$. At one side, the body 9 is formed with a downwardly pointing angular branch $9^b$, to whose lower end the usual flexible dispensing hose 13 may be applied by means of a threaded coupling $13'$. In order to reach the branch $9^b$, the gasolene that is lifted by the upstrokes of the piston $3'$, flows over a dam $9^d$, which is located at the junction of the body and the branch, as shown in Fig. 2. This lifting of the gasolene is effected by the operation of the crank 7 in the proper direction, and if the parts of the pump and measuring mechanism are in the proper condition, the gasolene should start to flow over the dam during the first turn of the said crank, and the flow of the gasolene should cease at the completion of each upstroke of the piston. According to the arrangement of the vending machine, the piston is lowered by the reverse turning of the crank 7, and when the piston completes its downward or measuring stroke, the gasolene refills the cylinder 3 above the piston and also wells up in the parts 8—9 to a level that coincides with the dam $9^d$, as shown in Fig. 2, ready to flow over said dam at the first turn of the crank 7 at the beginning of the next vending operation. The lifting and dispensing of the gasolene is controlled by two check-valves, as $3^e$—$3^f$. The check-valve $3^e$ is located in the bottom $3^x$ of the cylinder 3, the said valve being arranged to open by the suction of the piston $3'$ during its upward strokes for filling the cylinder. The valve $3^f$ is located in the piston $3'$ and is opened by the downward strokes of the piston, by which the contents of the cylinder 3 are forced upwardly into the pipe 8 and the body 9 of the indicator, as described.

According to the present invention, in order to afford the ready indication of the proper level of the gasolene, at the start of each vending operation, each of the windows 12 is inscribed with an arrow or other suitable mark, as shown in Figs. 1, 2 and 3, so that when the next customer arrives at the filling station, he may instantly note, by simply peering through the windows 12, whether or not the pumping mechanism is in perfect order, and whether he is going to get the correct and full measure of gasolene. When the level of the gasolene in the chamber $9^c$ coincides with the arrows on the windows, it indicates that there is no leak or other fault in the pump, or in the supply lines at either side of the pump. If however, the level of the gasolene in chamber $9^c$ shows lower than the arrows, it will unmistakably indicate that there is a leak or defect somewhere in the supply and delivery lines, or in the pump, and that the amount of gasolene the mechanism is about to deliver to the automobile, will fall short of the predetermined measurement. It often happens that the pumping mechanism at a filling station is defective, and that even the operator of the station is unaware of the fault, due to the fact that the supply line and pumping mechanism are entirely lacking in facilities for inspecting and determining the causes of short or false measure, unless the lines or pump are dismantled. The top end of the body 9 is threaded for facilitating the mounting of the usual air-vent cap, as 14 (see Fig. 1), which effects the draining of the hose 13 at the end of each dispensing operation.

My liquid level indicator is extremely simple and may be produced and installed at slight expense. By its use the slightest leak or other defect in the gasolene measuring and vending mechanism may be instantly detected by the vendor, as well as by the customer. The device has no working parts, requires no adjustments, and is not liable to get out of order during long use. With but slight change, my indicator may be readily applied to any of the overhead delivery pipes in common use.

Having thus described my invention, what I claim, is—

1. In a liquid level indicator, the combination with a measuring pump and an upright delivery pipe, of an elongated hollow body supported on the top end of said pipe and receiving liquid lifted by said pump, said body having a downward angular branch and a dam at the junction of the body and branch over which the liquid flows into the branch, the front and rear walls of said body being formed with openings in line with its longitudinal axis, strips of transparent glass overlying said openings, said strips being inscribed with markings that coincide with the crest of said dam, and slotted plates for clamping the glass in place.

2. In a liquid level indicator for measuring pumps including an overhead delivery pipe, an elongated hollow body adapted to be mounted on the upper end of said pipe and to receive liquid lifted by the pump, said body being formed with a hollow branch and a dam at the junction of the branch for controlling the level of the liquid in the discharge line between the vending operations, the said body having registering longitudinal openings for affording a view of the height of the liquid in said body, and transparent plates sealing said openings and enabling customers to note the level of the liquid relatively to the crest of the dam, said plates bearing indices disposed in the plane of the crest of the dam.

3. The combination with a liquid measuring pump and an overhead discharge pipe, of a hollow elongated body mounted on the top end of said pipe and having an angular branch adapted to support a dispensing hose, and a dam for controlling the flow of liquid from the body towards said hose, the opposite walls of the body being formed with observation openings, through which the level of the liquid in the body may be seen, and strips of transparent glass closing said openings and bearing marks that coincide with the plane of the crest of the dam for indicating the normal level to which the liquid should be lifted by the pump during the measuring periods.

4. The combination with a gasolene measuring pump including an overhead discharge pipe, of a hollow body adapted to be mounted upon the top end of said pipe and to receive the gasolene lifted by the pump, said body being formed with a hollow branch for conducting the gasolene from the body towards the vending point, and with a dam at the junction of the body with the branch, said dam representing the normal level of the gasolene at the end of the measuring periods, the opposite sides of the body being formed with similar longitudinal bosses having central vertical openings which extend above and below the dam and are formed with marginal recesses, and strips of transparent glass disposed in said recesses and overlying said openings, said strips bearing transverse marks in the plane of the crest of the dam for indicating whether or not the pump is conditioned to lift the predetermined measure of gasolene during a vending operation.

In testimony whereof I affix my signature.

CHARLES I. SMITH.